(12) United States Patent
Wright

(10) Patent No.: US 11,884,210 B2
(45) Date of Patent: Jan. 30, 2024

(54) MODULAR VEHICLE CARGO CARRIER SYSTEM

(71) Applicant: MESA CARRIERS, LLC, Fort Worth, TX (US)

(72) Inventor: Douglas Wright, Fort Worth, TX (US)

(73) Assignee: Mesa Carriers, LLC, Fort Worth, TX (US)

( * ) Notice: Subject to any disclaimer, the term of this patent is extended or adjusted under 35 U.S.C. 154(b) by 177 days.

(21) Appl. No.: 17/574,309

(22) Filed: Jan. 12, 2022

(65) Prior Publication Data

US 2022/0234509 A1 Jul. 28, 2022

Related U.S. Application Data

(60) Provisional application No. 63/140,486, filed on Jan. 22, 2021.

(51) Int. Cl.
*B60R 9/00* (2006.01)

(52) U.S. Cl.
CPC ..................... *B60R 9/00* (2013.01)

(58) Field of Classification Search
CPC .. F16B 7/044; B65D 7/30; B65D 7/32; B65D 11/1866; B65D 11/1873; B60R 2011/0082; B60R 2011/008; B60R 9/06; B60R 9/00; B60R 9/08; B60R 2011/004
USPC ..... 224/519–521, 452–454, 524–526, 42.32, 224/42.33
See application file for complete search history.

(56) References Cited

U.S. PATENT DOCUMENTS

| | | | | |
|---|---|---|---|---|
| 5,033,662 A * | 7/1991 | Godin | ..................... | B60R 9/065 296/57.1 |
| 5,433,357 A * | 7/1995 | Alliff | ........................ | B60R 9/06 224/510 |
| 6,811,163 B1 * | 11/2004 | Gurule | ..................... | B62B 3/02 280/79.3 |
| 9,333,822 B1 * | 5/2016 | LaFave | ..................... | B60R 9/06 |
| 10,035,472 B1 * | 7/2018 | Turner | ..................... | A47B 3/10 |
| 10,723,187 B2 * | 7/2020 | Corns | ..................... | B60D 1/52 |

\* cited by examiner

*Primary Examiner* — Adam J Waggenspack
(74) *Attorney, Agent, or Firm* — Park, Vaughan, Fleming & Dowler LLP; Shane Nelson

(57) ABSTRACT

The present disclosure provides a cargo carrier system that is modular and can be arranged for a variety of applications, accessories, and cargo. The cargo carrier system has a modular base with a frame and a plurality of receptacles located within the frame configured to receive attachments. The base may have a rectangular frame coupled to a substantially flat top surface. Different components may be coupled to the frame by using standardized coupling attachments, thereby forming a highly customizable and modular system. Removable rails and clamping devices may be coupled to the base in a specific configuration and may be arranged based on the cargo being carried. A latching system couples the rails and other accessories to the base, as well as the cargo within the modular carrier system.

25 Claims, 6 Drawing Sheets

MODULAR VEHICLE CARGO CARRIER SYSTEM

BACKGROUND OF THE INVENTION

This application claims priority to U.S. provisional patent application No. 63/140,486, filed on Jan. 22, 2021, the entire contents of which is incorporated herein by reference.

FIELD OF THE INVENTION

The present invention relates to cargo carriers, and more particularly to a cargo carrier system for vehicles.

DESCRIPTION OF THE RELATED ART

Conventional cargo carriers are cumbersome, heavy, expensive, and lack any ability to be versatile or capable of being used for a variety of different applications. Consumers are forced to "jury-rig" all manner of applications to existing designs, which creates a stability and safety issue. Consumers are also forced to pay for additional single-use carriers for different applications.

A need exists for an improved cargo carrier that is lightweight and versatile. A need exists for an improved cargo carrier that is modular and that can be suited and/or arranged for a variety of occasions and applications. A need exists for a standardized base that can accommodate a variety of accessories and cargo.

SUMMARY OF THE INVENTION

The present disclosure provides a cargo carrier system that is modular and can be arranged for a variety of applications, accessories, and cargo. The cargo carrier system has a modular base with a frame and a plurality of receptacles located within the frame. The base may have a rectangular frame coupled to a substantially flat top surface. Different components may be coupled to the frame by using standardized coupling attachments, thereby forming a highly customizable and modular system. Removable rails may be coupled to the base in a specific configuration and may be arranged based on the cargo being carried. A latching system couples the rails and other accessories to the base, as well as the cargo within the modular carrier system.

Disclosed is a modular vehicular cargo carrier system that comprises a substantially flat base with a plurality of receptacles and a first plurality of removable rails coupled to the base via the plurality of receptacles.

Disclosed is a modular cargo carrier that comprises a base with a frame and a substantially flat top coupled to the frame, such that the frame has a plurality of receptacles configured to receive a plurality of carrier attachments.

Disclosed is a vehicle carrier system that comprises a hitch insert, an accessory bar coupled to the hitch insert, and a plurality of receptacles located within the accessory bar configured to receive a plurality of accessory attachments.

Disclosed is a vehicle carrier system that comprises an accessory device and an accessory bar coupled to the accessory device, wherein the accessory bar comprises a plurality of receptacles, and a securing rail that is configured to couple with the accessory bar, wherein the securing rail comprises a plurality of protrusions that correspond to one or more of the plurality of receptacles.

Disclosed is a vehicle carrier system that comprises an attachment rail that is configured to couple with a carrier base, a fastening device configured to couple with the attachment rail, wherein the attachment rail comprises a first locking receptacle and a second locking receptacle, wherein the fastening device comprises an elastic cable that interfaces with the first locking receptacle and a latch that interfaces with the second locking receptacle.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
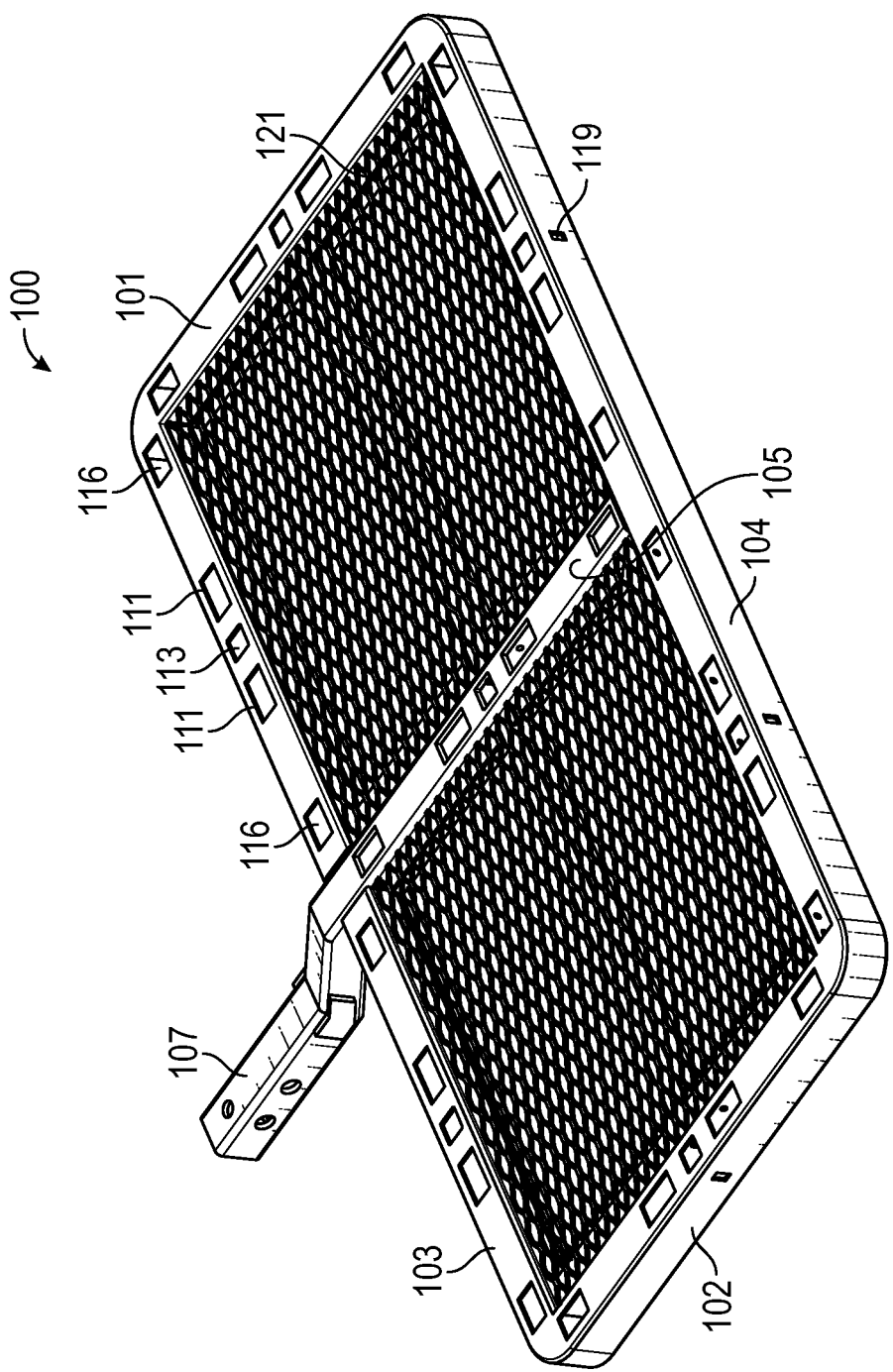
FIG. 1 illustrates a perspective view for a modular carrier base according to one embodiment of the present disclosure.

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Overview

The present disclosure provides a modular cargo system that can be used on the roof of a vehicle or attached to the vehicle's hitch. It is a modular system that comprises a specifically designed cargo carrier base with fittings for complimentary cargo parts, rails, and accessories. It is lightweight, portable, and inexpensive to purchase and manufacture. The individual and modular components are standardized such that a wide variety of different cargo can be securely stored and/or accessories coupled to the base. The top portion of the base plate is a substantially flat surface into which rails and other components or accessories may be inserted as modular components with similar attachment mechanisms. In one embodiment, it comprises a modular drop in and latch rail system of various sizes designed to fit the base of the carrier system. In one embodiment, it may comprise a latch system that is removable and interchangeable and be utilized to lock the different modular components together and/or the cargo to the carrier. A wide variety of accessories can be coupled to the modular carrier system. For example, accessories may include but not be limited to grills, canopies, coolers, firewood racks, bicycle racks, cargo bags, hunting, shooting, and fishing accessories, shooting rests, picnic tables, tents, kennels, commercial use equipment, etc. Each of these accessories may have any number of sizes, shapes, and materials, and in one embodiment may have the standardized attachment system of slots and pegs such that the carrier system as a whole is modular.

FIG. 1 illustrates a perspective view for a modular carrier base according to one embodiment of the present disclosure. In one embodiment, base 100 is substantially rectangular and has a substantially smooth and/or flat top surface. In one embodiment, the base comprises a rectangularly shaped frame to which a substantially flat plate 121 is coupled. In one embodiment, the base may be approximately 60" wide by 30" deep, and in another embodiment may be approximately 48" wide and 24" deep. Other shapes and sizes are within the scope of this disclosure. In one embodiment, the frame may be made of square or round pipe (such as 2" square aluminum tubing), and plate 121 may have a diamond mesh pattern and be welded to the frame. Other configurations are within the scope of one skilled in the art, and the base may be metallic or non-metallic. Base 100 has a frame that has a plurality of frame members that are coupled together to form the shape of the base. The members may be aluminum or steel, or any other metal or plastic. As illustrated in FIG. 1, in one embodiment, the base frame comprises front member 104, rear member 103, left member 102, and right member 101, with connecting member 105 between the front member and the rear member. The frame may be coupled to a hitch insert 107 that can be inserted into a standard vehicle hitch. Each of the frame members may have a plurality of receptacles 111, 113, 116 configured to receive different attachments to the base (based on their own corresponding protrusions or pegs). The receptacles may comprise round, triangular, rectangular, or square shaped holes or slots. In one embodiment, the receptacles are cut into the tubing of the frame, as illustrated in FIG. 1. FIG. 1 illustrates rectangularly shaped receptacles. The receptacles may have different sizes and configurations to hold different rails or attachment devices. As illustrated in FIG. 1, the top portion of the plate is a substantially flat surface into which modular rails and other components or accessories may be inserted. In one embodiment, any of the accessories may be based on the standardizing peg and slot system to appropriately couple to the base. In one embodiment, the plate may also have locking receptacles 119, which are configured to receive a portion of a latching mechanism or fastener (see FIG. 3A) to secure any rails or devices to the cargo base, in side portions of the frame members adjacent to receptacle 113.

Figure 2A:
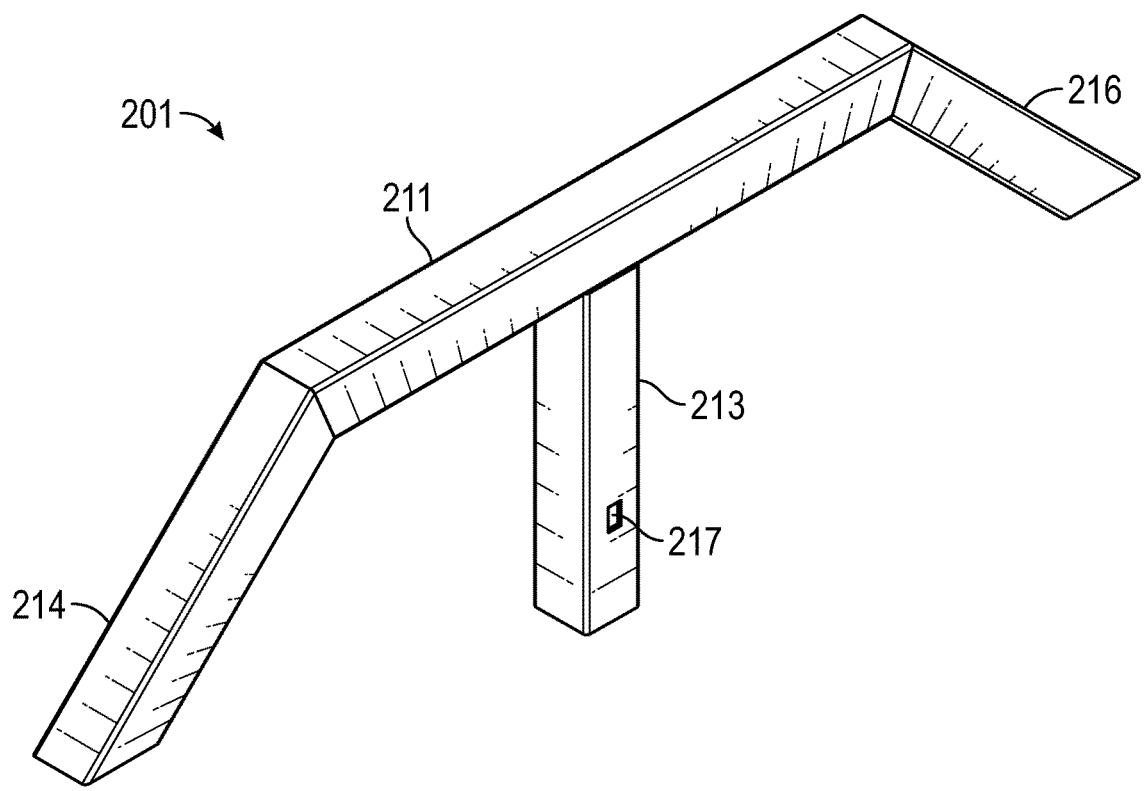
FIGS. 2A and 2B illustrate a perspective view of a removable rail for the modular carrier base of FIG. 1.
Figure 2B:
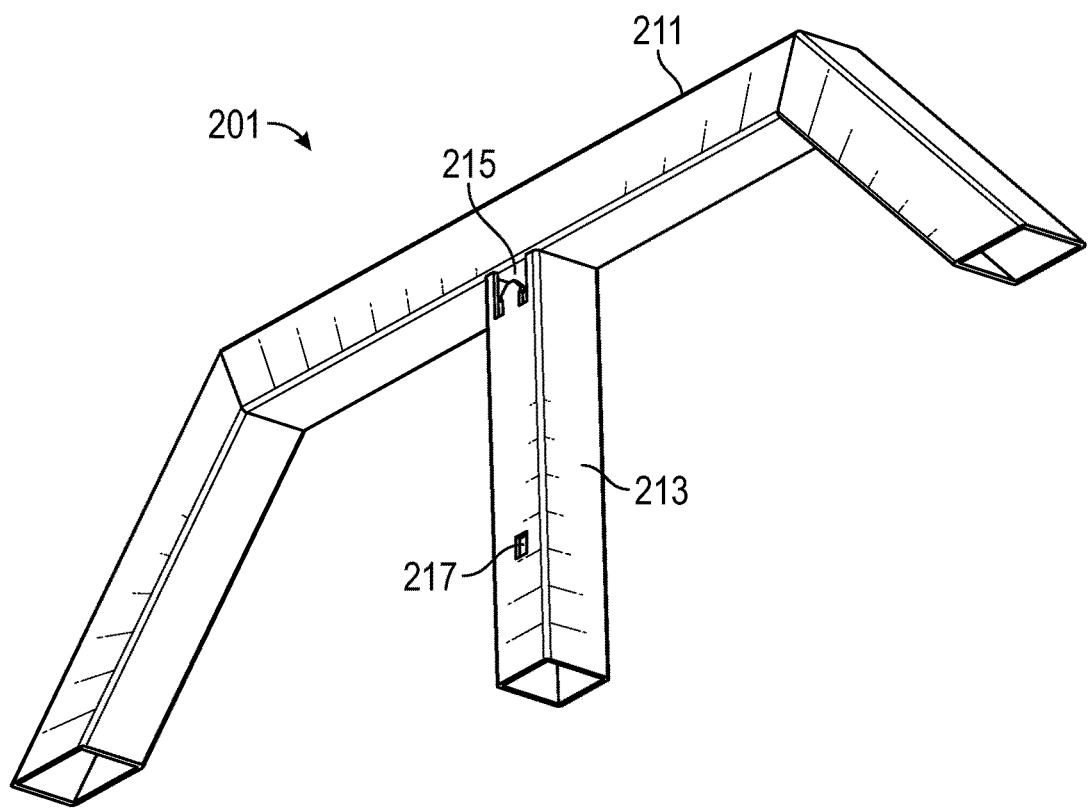

FIGS. 2A and 2B illustrate a perspective view of a removable side rail for the modular carrier base of FIGS. 1A and 1B. Removable rail 201 may be coupled to base 100 by insertion of one or more protrusions of the rail into corresponding receptacles of the base. Any number of rail configurations may be inserted into the base, as long as a protrusion of the rail matches a corresponding receptacle of the base. In one embodiment, a plurality of rails is coupled to a single base. In one embodiment, each rail has a plurality of protrusions, while in other embodiments portions of the rail frame itself may be inserted into the receptacles on the base frame. In one embodiment, the removable rail acts as a securing mechanism or attachment point to connect other components besides the rail to the base.

In one embodiment (not illustrated), removable rail 201 may comprise a horizontal member with smaller protrusions from the bottom of the base frame that are inserted into one or more receptacles on the base frame. In other embodiments, such as shown in FIGS. 2A and 2B, removable rail 201 may comprise one or more horizontal members 211 and one or more vertical members 213, such that one or more of the vertical members is inserted into a receptacle on the base frame and acts functionally as the protrusion. In one embodiment, the rail may have other vertical members, such as slightly angled member portions 216, which extend from horizontal member 211. In some embodiments, the angled portions 216 may also fit into corresponding receptacle on the base frame. In one embodiment, the removable rail is made from metal or plastic, such as 1.0" square metal tubing. In one embodiment, the rail 201 may be locked and/or fastened to the base frame by a latching or locking mechanism (see FIGS. 3A and 3B). In one embodiment, a portion of a latching system may be located on the rail and the base. For example, latching receptacle 215 may be located on a portion of the removable rail system, and be configured to couple with a strap or bungee cord. Similarly, locking receptacle 217 may be located on a member of the rail (such as vertical member 213) and be configured to interface with a protrusion of the latch (such as protrusion 317) or a separate key (such as latch 350). Comparing FIG. 1 and FIGS. 2A and 2B, member 213 of rail 201 may be inserted into center receptacle 113 of the base, and side portions 216 of the rail may be inserted into side receptacles 116 of the base. In one embodiment, multiple protrusions or portions of the rail are inserted into the base for increased stability and strength. Various other rail designs may be utilized and coupled with the disclosed base platform and the teachings herein. In one embodiment, the rails are fully interchangeable at any location of the cargo base, such that a side rail may be used on the front, rear, or side of the base, and may also be stacked vertically on other rails. Further, various accessories may be coupled to the rails using the disclosed peg/slot system. Still further, a latching mechanism (see FIGS. 3A and 3B) may be inserted into the rails for increased stability/fastening. In one embodiment, a first portion of a latching mechanism is secured and/or fastened into receptacle 215 and a second portion of a latching mechanism is secured and/or fastened into receptacle 217. Latching receptacle 215 may have a plurality of prongs or other securing device such that an elastic cable can be secured within the receptacle.

In some embodiments, a rail may have protrusions on the bottom of the rail and receptacles on the top of the rail, which allows stacking of the rails on top of each other or the ability to attach different devices to the rails for added user configuration. For example, each rail may have a plurality of receptacles into which additional levels of rails or accessories may be attached, depending on the size and arrangement of the cargo to be utilized within the carrier system. In one embodiment, the receptacles on the base are the same as the receptacles on the rails, such that the overall carrier system has a standardized receptacle/protrusion peg and slot system that allows for a wide range of component arrangements.

Figure 3A:
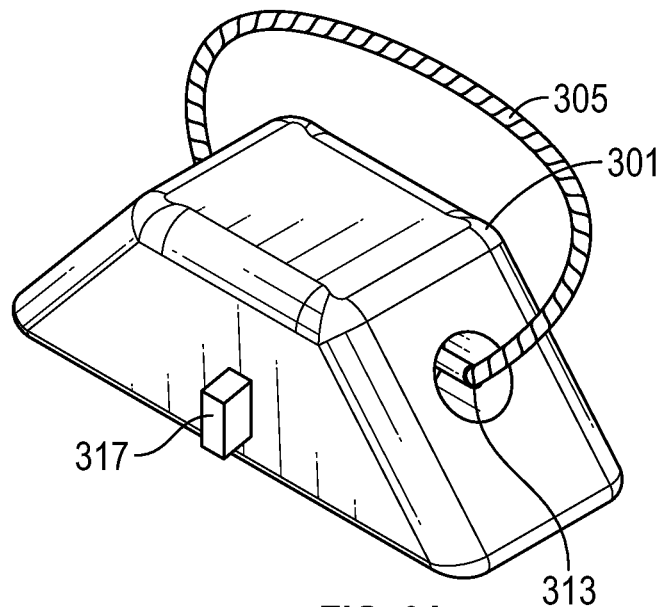
FIGS. 3A and 3B illustrate a perspective view of one embodiment of a fastening device for the modular carrier base of FIG. 1.
Figure 3B:
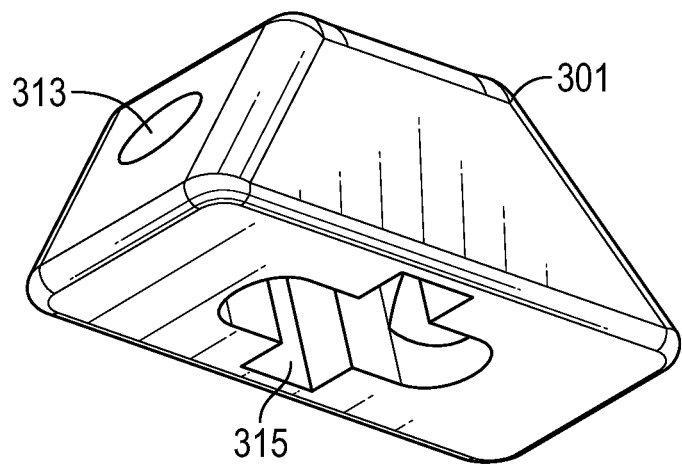

FIGS. 3A and 3B illustrate a perspective view of a fastener for the modular carrier base of FIG. 1 according to one embodiment of the present disclosure. FIG. 3A illustrates fastening block 301 from a top perspective, with stretchable/elastic cord 305 coupled to the fastening block, while FIG. 3B illustrates fastening block 301 from a bottom perspective without a cord. Looking at FIGS. 3A and 3B, in one embodiment, fastening block 301 comprises side holes 313 and bottom hole 315, as well as a side protrusion 317. In other embodiments, side protrusion 317 is not needed. The shape of the fastening block can be any variety of shapes/configurations. In one embodiment, stretchable cord 305 is coupled to fastening block 301. In one embodiment, each end of the cord is inserted into side hole 313, and tied together via bottom hole 315, to secure the cable to the fastening block. A portion of cable 305 may be secured to a portion of the rail, such as looping cable 305 onto locking receptacle 215 (see FIG. 2B). Likewise, a portion of fastening block 301 may be secured to a portion of the cargo base, such as inserting protrusion 317 into locking receptacle 119 (see FIG. 1) and/or locking receptacle 217 (see FIG. 2B). In one embodiment, some or all portions of the fastening device may be rubber, which allows the fastening device to stretch to securely couple the rail to the base. The rubberized latch also reduces vibrations from the moving of system components during driving conditions. Other fastening devices may be utilized to similarly securely couple the rail (or other attached mechanism) to the cargo base. For example, the entire latching mechanism may be formed of rubber and each end may be configured (such as by specifically designed protrusions) to lock into a receptacle on the rail and base frame. In one embodiment, such a rubber latch comprises a first protrusion on a first end and a second protrusion on a second end, wherein the fastener may be adapted to move between a first position and a second position to secure the two components. In other embodiments, the fastening block may have upper openings instead of side openings, such that openings 313 are located on an upper or top face of the fastening block. In some embodiments, protrusion 317 may be rubber and may simply be a protrusion on the fastening block, while in other embodiments, protrusion 317 may be a separate device coupled to the fastening block, such as a separate latch or key (such as device 350 in FIG. 3C). In effect, protrusion 317 operates as a locking protrusion or member to engage the latch assembly to the base carrier.

Figure 3C:
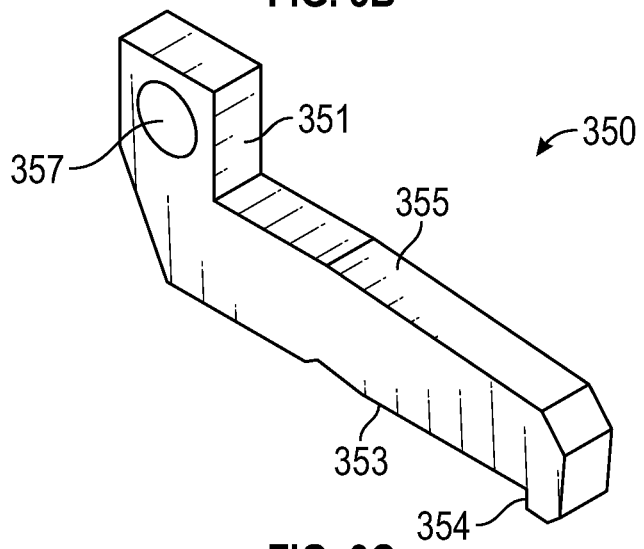
FIG. 3C illustrates a perspective view of another embodiment of a fastening device for the modular carrier base of FIG. 1.

FIG. 3C illustrates a perspective view of another embodiment of a fastening device for the modular carrier base of FIG. 1. Fastening device 350 comprises a key shaped fastener, which may be used to lock a rail (or other device) into the cargo carrier base of FIG. 1. In one embodiment, the side removable rail has a hole in a vertical member (see element 217 of FIG. 2A) a corresponding hole in a side portion of the cargo base (see element 119 of FIG. 1). When the holes are aligned, a key (such as latch 350) or other latching member may be inserted into the aligned holes to couple the two devices. The latch may have different angled portions, such as upper face 355 and lower face 353, with lower edge 354 and upper edge 351, to secure the key in place and prevent movement. In one embodiment, latch 350 may comprise hole 357, which can be used with an elastic cord to lock the key in place by a slight upward pressure/angle on the key. In some embodiments, latch 350 may also be used to couple other devices to the rail. In one embodiment, latch 350 is coupled with fastening block 301 to further assist in securing a rail or other device to the carrier base. For example, upper portion 351 of latch 350 may be inserted into lower hole 315 of fastening block 301. The bottom portion of the elastic cable 305 may be inserted into hole 357 to secure latch 350 to fastening block 301. In one embodiment, an end of latch 350 (such as latch portion 354) may be inserted into latching receptacle 217 of the removable rail and end of cable 305 is secured in latching receptacle 215. In one embodiment, the elastic force of the cable continually pulls on latch 350 in an upward direction to secure the faces and edges of the latch in the appropriate positions of the locking receptacles.

Figure 4:
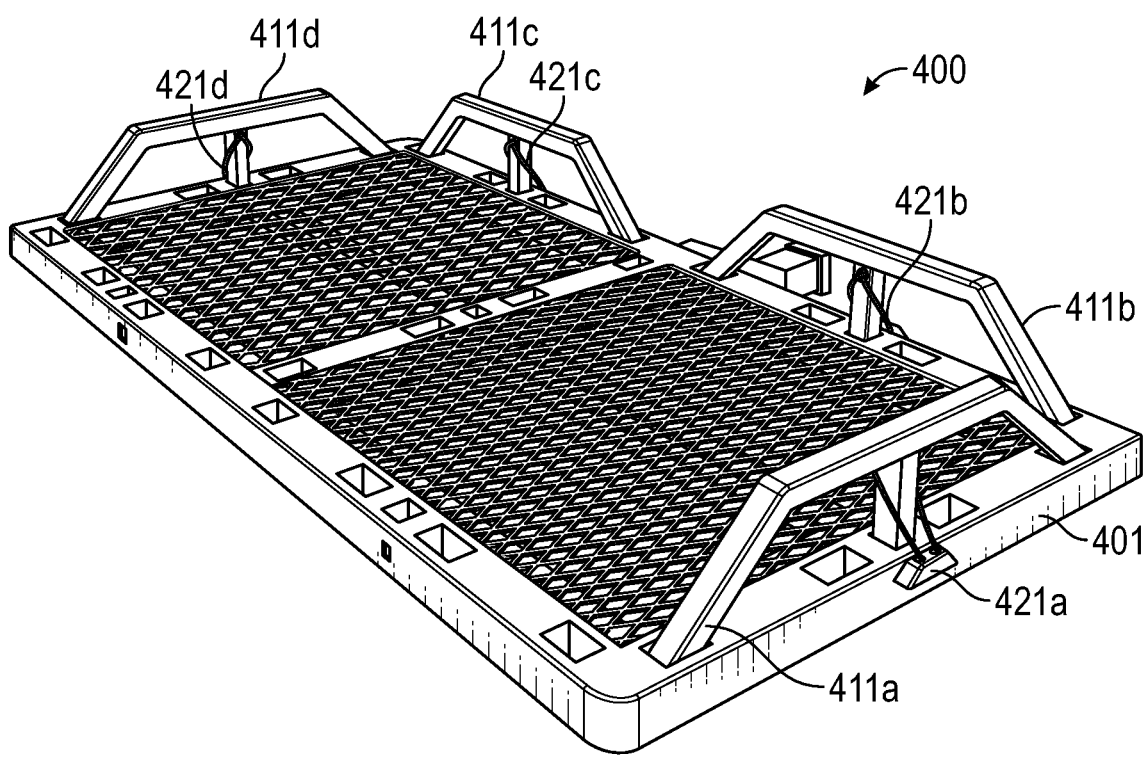
FIG. 4 illustrates a perspective view of a fully assembled modular cargo carrier system, according to one embodiment of the present disclosure.

FIG. 4 illustrates a perspective view of a fully assembled modular cargo carrier system, according to one embodiment of the present disclosure. Cargo carrier system 400 comprises base 401 coupled to side rails 411a-d via latching mechanisms 421a-d. Cargo base 401 is substantially similar to base 100 disclosed in FIG. 1, while side rails 411 are substantially similar to side rails 201 disclosed in FIGS. 2A and 2B, while latching mechanisms 421 are substantially similar to fasteners disclosed in FIG. 3A. Four side rails are illustrated in FIG. 4. As illustrated, any number and configuration of side rails, devices, and accessories is possible based on the intended use of the base and the intended cargo.

The disclosed base assembly allows a variety of cargo to be held on the base platform in a secure manner. Similarly, the disclosed base assembly allows a variety of devices and accessories to be coupled to the base platform based on the disclosed receptacles and design, providing a highly modular cargo carrier. In one embodiment, it may comprise a latch system that is removable and interchangeable and be utilized to lock the different modular components together and/or the cargo to the carrier. A wide variety of accessories can be coupled to the modular carrier system. For example, accessories may include but not be limited to grills, canopies, coolers, firewood racks, bicycle racks, cargo bags, hunting, shooting, and fishing accessories, shooting rests, picnic tables, tents, kennels, commercial use equipment, etc. Each of these accessories may have any number of sizes, shapes, and materials, and in one embodiment may have the standardized attachment system of slots and pegs such that the carrier system as a whole is modular. For example, if the grill accessory is a barbeque grill attachment, the base of the grill attachment may have a plurality of protrusions or members that can be inserted into the receptacles of the base frame and coupled to the disclosed cargo base. In other words, similar to the rails disclosed in FIGS. 2A and 2B, the accessory has similar protrusions/pegs that can couple to the cargo carrier base in a modular fashion.

Figure 5A:
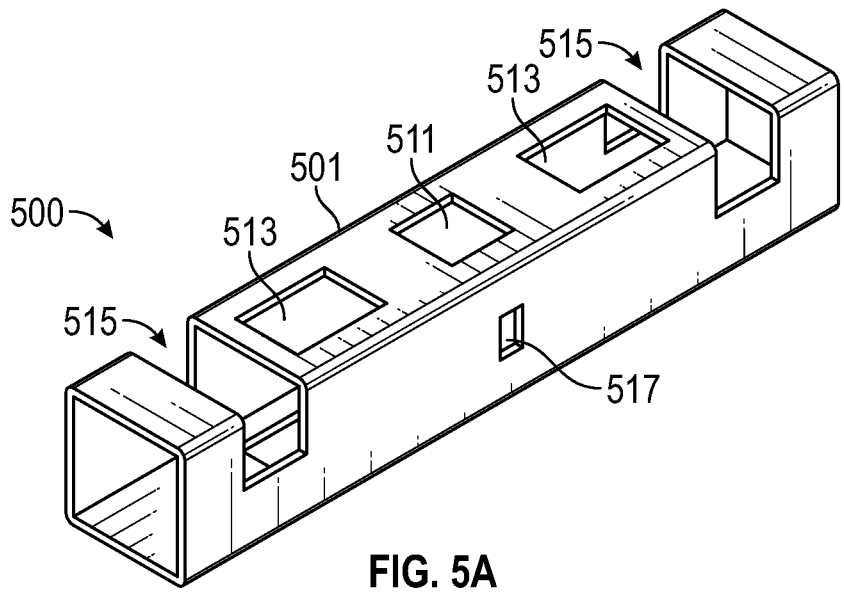
FIGS. 5A and 5B illustrate a perspective view of an accessory clamp according to one embodiment of the present disclosure.
Figure 5B:
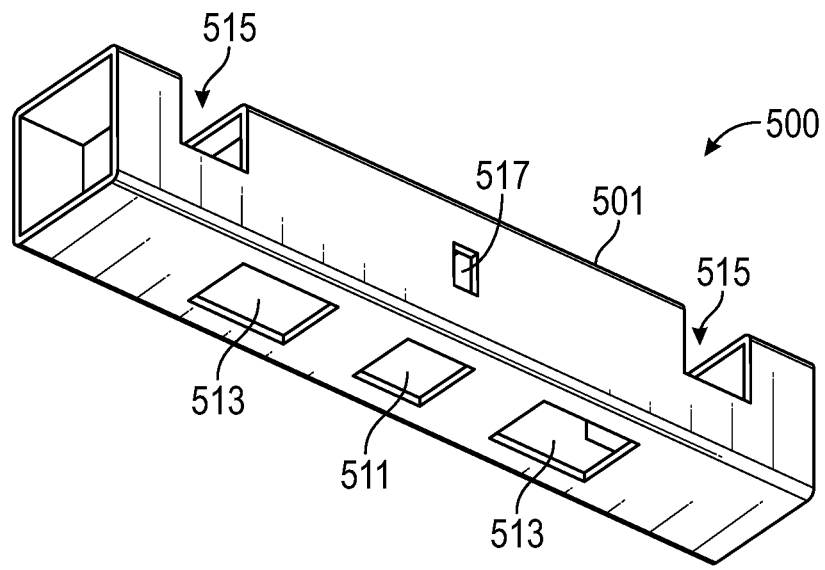
Figure 6A:
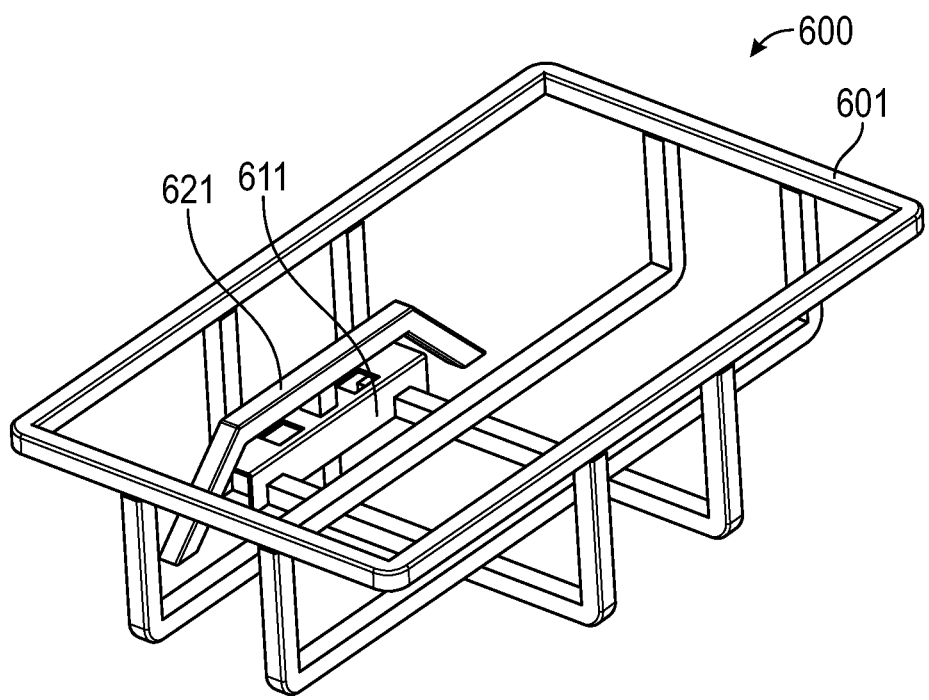
FIG. 6A illustrates a perspective view of a carrier base accessory that can be coupled to the cargo carrier system of FIG. 1, according to one embodiment of the present disclosure.
Figure 6B:
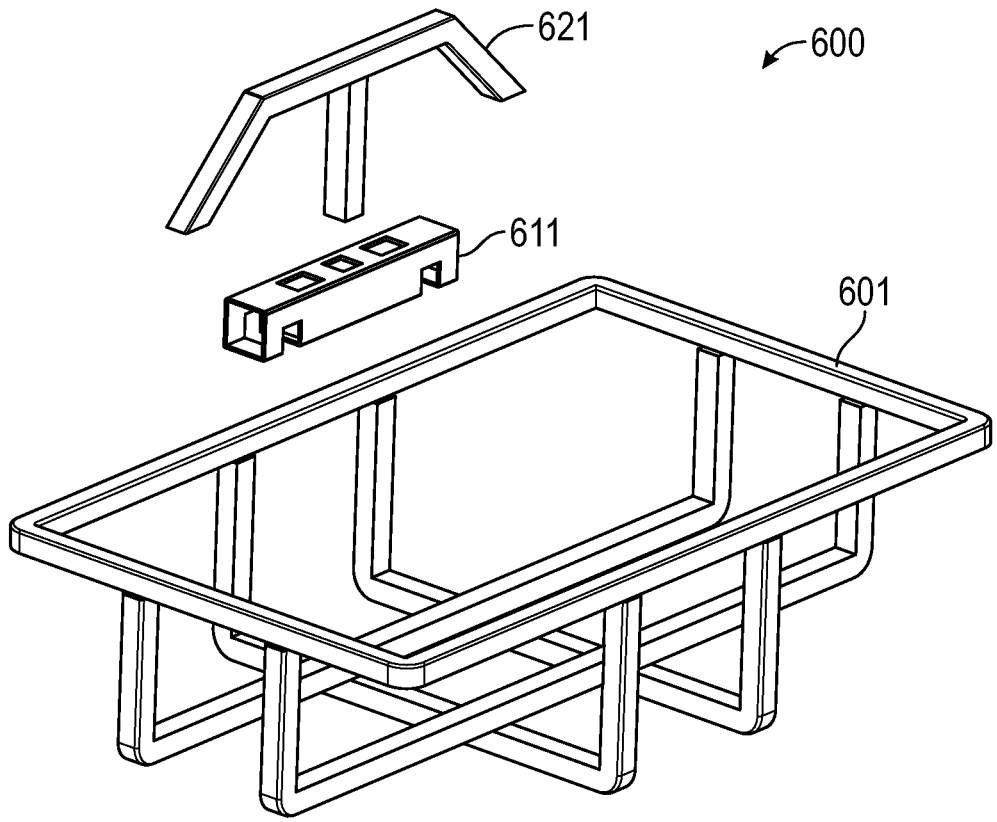
FIG. 6B is an exploded view of the components from FIG. 6A.

FIGS. 5A and 5B illustrate a perspective view of an accessory clamp and/or accessory bar according to one embodiment of the present disclosure, showing a top and bottom view of the accessory clamp. In one embodiment, clamp 500 has a similar receptacle pattern as the base frame as illustrated in FIG. 1, which allows it to be coupled to the base frame and the rail. In one embodiment, clamp accessory 500 comprises bar 501 with middle opening 511 and side openings 513, which allow rail 201 to be inserted and/or coupled with the clamp accessory. Clamp accessory 500 may be configured with a side locking receptacle 517, which allows a latching mechanism (such as lock 350) to couple a rail to the clamp accessory and/or the clamp accessory to the cargo base. Clamp accessory 500 may also comprise one or more grooves 515 or other attachment points to couple an accessory to the clamp accessory; in other embodiments, side notches or grooves 515 may not be used and an accessory or other device is simply welded to the accessory clamp. In one embodiment, clamp accessory is configured to couple any type of accessory (such as a bike or grill) to the frame by using similar receptacles and protrusions/rails. Clamp accessory 500 therefore acts as a modular connecting device by allowing any number of devices or accessories to be coupled to the base carrier frame by the same or similar fastening mechanism. FIGS. 6A and 6B, described in more detail below, illustrate one such accessory.

Figure 5C:
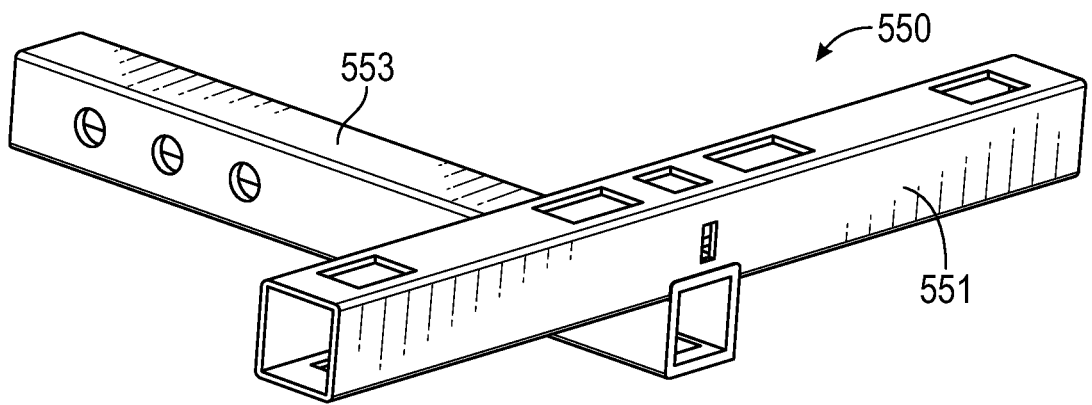
FIG. 5C illustrates a perspective view of an accessory clamp of FIG. 5A coupled to a hitch insert, according to one embodiment of the present disclosure.

FIG. 5C illustrates a perspective view of the accessory clamp of FIG. 5A coupled to a hitch insert, according to one embodiment of the present disclosure. Hitch carrier 550 comprises clamp accessory 551 coupled to hitch insert 553. Clamp accessory 551 is substantially similar to clamp accessory 500, but without groove openings 515. Rail 201, and any similar attachment mechanism, may be coupled to hitch carrier 550 in a similar way that rail 201 is coupled to the base carrier in FIG. 1.

FIG. 6A illustrates a perspective view of a carrier base accessory that can be coupled to the cargo carrier system of FIG. 1, according to one embodiment of the present disclosure. FIG. 6B is an exploded view of the components from FIG. 6A. Accessory system 600 comprises accessory 601 coupled to clamp accessory 611 via weld, while in other embodiments bolts, screws, straps, or other fasteners may be utilized. In this embodiment, accessory 601 comprises a frame of multiple members, two members of which may be inserted into the corresponding notches 515 of the clamp accessory. Accessory 601 comprises a cargo rack, such as for luggage or an ice chest, but any number of accessories or devices can be similarly fastened to accessory clamp 611. When desired by a user, the accessory device may be coupled to a cargo base carrier (such as in FIG. 1) via rail 621 and a latching mechanism. In this manner, the cargo base carrier is highly configurable and modular in that any number of components can be readily and securely fastened to the cargo base. In one embodiment, clamp accessory 611 is substantially similar to clamp accessory 500 and rail 621 is substantially similar to rail 201.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the system are within the scope of the invention. For example, the cargo system may be utilized on the top rack of a vehicle or coupled to the rear hitch of a vehicle. The base of the system may or may not be substantially rectangular. Removable cargo carrier accessories may be intended for secure storage while the vehicle is in motion or only when the vehicle remains stationary. Accessories and other attachments may be single-part, multi-part, mechanical in nature, electronic, and made of substantially any material. Accessories and attachments may be used for cargo securement and storage, and also for other various uses for use while either vehicle is in motion or stationary. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A modular vehicular cargo carrier system, comprising: a substantially flat base with a plurality of receptacles; and a plurality of removable rails coupled to the base via the plurality of receptacles, a fastening device that securely attaches each of the plurality of removable rails to the base, wherein each of the plurality of rails comprises a first locking receptacle and a second locking receptacle, wherein the fastening device comprises an elastic cable that couples with the first locking receptacle and a latch that couples with the second locking receptacle.

2. The cargo carrier system of claim 1, wherein the base is substantially rectangular.

3. The cargo carrier system of claim 1, wherein the plurality of removable rails comprises a left rail coupled to a left side of the base and a right rail coupled to the right side of the base.

4. The cargo carrier system of claim 3, wherein the plurality of removable rails comprises one or more of a front rail coupled to a front side of the base and a back rail coupled to a back side of the base.

5. The cargo carrier system of claim 1, wherein each of the plurality of removable rails comprises a plurality of protrusions configured to couple with the plurality of receptacles.

6. The cargo carrier system of claim 1, wherein each of the plurality of removable rails comprises one or more portions configured to be inserted into the plurality of receptacles.

7. The cargo carrier system of claim 1, wherein each of the plurality of removable rails is substantially the same size.

8. The cargo carrier system of claim 1, a fastening device that securely attaches each of the plurality of removable rails to the base.

9. The cargo carrier system of claim 8, wherein each of the plurality of rails comprises a first locking receptacle and a second locking receptacle, wherein the fastening device comprises an elastic cable that couples with the first locking receptacle and a latch that couples with the second locking receptacle.

10. The cargo carrier system of claim 1, wherein the cargo carrier system is configured to couple to a rear hitch of a vehicle.

11. The cargo carrier system of claim 1, wherein the base comprises tubing and a substantially flat platform coupled to the tubing.

12. The cargo carrier system of claim 1, wherein the plurality of receptacles is in the shape of a rectangle.

13. A modular vehicular cargo carrier, comprising:
a base that comprises a frame and a substantially flat top coupled to the frame; and
a plurality of receptacles located within the frame base configured to receive a plurality of carrier attachments, a plurality of carrier attachments for receipt within at least one of the plurality of receptacles, at least one of the carrier attachments comprising a removable rail, and a fastening device that securely attaches the removable rail to the base, wherein the removable rail comprises a first locking receptacle and a second locking receptacle, wherein the fastening device comprises an elastic cable that couples with the first locking receptacle and a latch that couples with the second locking receptacle.

14. The cargo carrier of claim 13, wherein the plurality of receptacles is in the shape of a rectangle.

15. The cargo carrier of claim 13, wherein one of the plurality of carrier attachments comprises a carrier accessory, wherein the carrier accessory comprises a plurality of protrusions configured to couple with the plurality of receptacles.

16. The cargo carrier of claim 13, wherein at least one of the carrier accessories comprises a grill.

17. The cargo carrier of claim 13, wherein at least one of the carrier accessories comprises a bicycle rack.

18. A vehicle carrier system, comprising:
a hitch insert;
an accessory bar coupled to the hitch insert; and
a plurality of receptacles located within the accessory bar configured to receive a plurality of accessories, an accessory for receipt in one or more of the plurality of receptacles comprising a removable securing rail that couples an accessory to the accessory bar, and a fastening device that securely attaches the removable securing rail to the base, wherein the removable securing rail comprises a first locking receptacle and a second locking receptacle, wherein the fastening device comprises an elastic cable that couples with the first locking receptacle and a latch that couples with the second locking receptacle.

19. The carrier system of claim 18, further comprising a bicycle rack coupled to the accessory bar.

20. A vehicular carrier system, comprising:
an accessory device;
an accessory bar coupled to the accessory device, wherein the accessory bar comprises a plurality of receptacles; and
a securing rail that is configured to couple with the accessory bar, wherein the securing rail comprises a plurality of protrusions that correspond to one or more of the plurality of receptacles, and a fastening device that securely attaches the securing rail to the base, wherein the securing rail comprises a first locking receptacle and a second locking receptacle, wherein the fastening device comprises an elastic cable that couples with the first locking receptacle and a latch that couples with the second locking receptacle.

21. The carrier system of claim 20, wherein the accessory device comprises a framed cargo carrier.

22. The carrier system of claim 20, wherein the accessory device comprises a substantially flat base with a plurality of base receptacles configured to couple with the plurality of protrusions.

23. A vehicle carrier locking system, comprising:
an attachment rail that is configured to couple with a carrier base; and
a fastening device configured to couple with the attachment rail,
wherein the attachment rail comprises a first locking receptacle and a second locking receptacle,
wherein the fastening device comprises an elastic cable that interfaces with the first locking receptacle and a latch that interfaces with the second locking receptacle.

24. The carrier locking system of claim 23, wherein the fastening device is configured to secure the attachment rail to the carrier base.

25. The carrier locking system of claim 23, wherein the attachment rail comprises one or more of a plurality of members that is configured to be inserted into one or more receptacles of the carrier base.

* * * * *